Feb. 15, 1966  H. R. WALDT  3,235,199
REEL
Filed Sept. 26, 1963
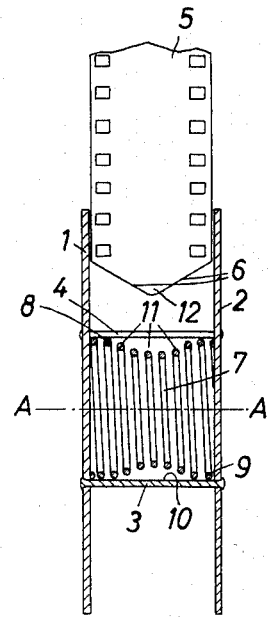
INVENTOR.
HANS WALDT
BY Connolly and Hutz
ATTORNEYS

United States Patent Office 3,235,199
Patented Feb. 15, 1966

3,235,199
REEL
Hans Reinhold Waldt, Munich, Germany, assignor to Agfa Aktiengesellschaft, Leverkusen-Bayerwerk, Germany, a corporation of Germany
Filed Sept. 26, 1963, Ser. No. 311,710
Claims priority, application Germany, Nov. 13, 1962, A 41,605
6 Claims. (Cl. 242—74.2)

This invention relates to a reel for winding film or tape, and it more particularly relates to such a reel for motion picture cameras and projectors.

Automatically threaded reels for motion picture cameras and projectors are susceptible to malfunctioning. They usually guide the film through a channel disposed close to the slot in the hub to insert it centrally within the hub for securing the film to it as winding is commenced. This mode of securing has proven to be susceptible to slippage, and the leading end of the film is likely to slip out of and run past the hub without being wound upon it. If this should occur in a camera without being promptly noticed, the film is damaged by exposure to light when the camera housing is opened.

An object of this invention is to provide a reel for winding thin strip such as film or tape that efficiently and dependably engages the leading end of the strip.

Another object is to provide a simple and economical form of such a reel that is particularly well adapted for automatic threading.

In accordance with this invention a coil spring is inserted concentrically within the hub of a strip winding reel. This coil has relatively larger and smaller diameter turns with the larger diameter turns disposed closely adjacent the inner wall of the hub and the others spaced a short distance from it. This permits the tapered leading end of a thin strip material, such as film or tape, to be inserted through a slot into the hub in the space provided by the smaller turns. The leading end is accordingly guided around the space until its edges are resiliently secured between the larger diameter turns and the inner wall of the hub. This securely fastens the leading end in condition for subsequent winding. A coil with the smaller coils in the center of the hub and the larger at its ends accordingly reliably secures an evenly tapered pointed leading end of a film to the hub. The resilient securing arrangement of this invention is a remarkable improvement in the reliability and efficiency of the automatic threading of film or tape upon winding reels.

A highly effective form of this invention is provided by inserting and securing the coil within the hub under a slight rotational tension. This provides a simple and dependable securing arrangement having a low assembly cost.

In a preferred form of this invention a coil with larger diameter turns at its ends and small diameter at its center is secured within the hub by press fitting its ends within it. This provides a simple and economical assembly which is particularly advantageous for securing a leading end of film having a double taper that forms a substantially central point. This is particularly advantageous for motion picture film which is accordingly secured within the perforated areas adjacent both of its sides.

Novel features and advantages of the present invention will become apparent to one skilled in the art from a reading of the following description in conjunction with the accompanying drawings wherein similar reference characters refer to similar parts and in which the single figure is a cross-sectional view in elevation of an embodiment of this invention.

As shown in FIG. 1, reel flanges 1 and 2 are connected to hollow hub 3, for example, by riveting, force fitting, cementing or brazing. Hub wall 10 includes a slot 4 into which the leading end 12 of film 5 having double tapered edges forming a substantially centrally tapered point is inserted. A coil spring 7 is inserted within hub 3 concentrically with axis of rotation A—A of the hub. The diameter of the relatively larger turns 8 and 9 at each end of spring 7 is large enough to press fit them within hub 3 thereby securing them within inner wall 10 of the hub 3 under a slight tension. These ends may be rotationally stressed by turning relative to each other in the direction of the rotation of the reel before insertion and securing within hub 3 to augment their film securing action. Turns 11 adjacent the center of hub 3 are of relatively smaller diameter to provide a space into which the tapered leading end 12 of film 5 is received and guided about coil spring 7 until the sides of film 5 adjacent the perforations become securely wedged between larger diameter turns and inner wall 10 of the hub. The aforementioned pretensioning of spring 7 improves and augments its securing action.

This invention may be utilized for reels for winding various forms of strip material such as tape in addition to the illustrated embodiment which constitutes a reel for winding motion picture film.

What is claimed is:

1. A reel for winding thin strip having a tapered leading end comprising a hollow hub connected between a pair of flanges, a slot in the side of said hub for insertion of said tapered leading end of said strip, a helical coil spring inserted concentrically within said hub, and said helical coil spring having turns of relatively larger diameter disposed adjacent the inner wall of said hub and turns of relatively smaller diameter spaced therefrom for receiving said tapered leading end directed into it from said slot and guiding it into the space between said helical coil spring and said inner wall of said hub whereby it is firmly secured between said larger diameter turns and said inner wall.

2. A reel for winding thin strip having a tapered leading end comprising a hollow hub connected between a pair of flanges, a slot in the side of said hub for insertion of said tapered leading end of said strip, a coil spring inserted concretely within said hub, said coil spring having turns of relatively larger diameter disposed adjacent the inner wall of said hub and turns of relatively smaller diameter spaced therefrom for receiving said tapered leading end directed into it from said slot and guiding it into the space between said coil spring and said inner wall of said hub whereby it is firmly secured between said larger diameter and said inner wall, said relatively larger diameter turns being disposed adjacent the ends of said hub and said relatively smaller diameter turns being disposed at a central portion of said hub for receiving a leading end having a double taper that forms a substantially centrally pointed leading end.

3. A reel as set forth in claim 1 wherein said relatively larger diameter turns are substantially equal in diameter to the inside diameter of said hub whereby they are force fitted within said hub to fasten them securely within it.

4. A reel as set forth in claim 3 wherein said relatively larger diameter turns are disposed adjacent the ends of said hub and said relatively smaller diameter turns are disposed at a central portion of said hub for receiving a leading end having a double taper that forms a substantially centrally pointed leading end.

5. A reel as set forth in claim 4 wherein said helical coil is rotationally stressed between its secured ends in the direction of rotation of said reel whereby its securing action relative to said strip against said inner wall of said hub is augmented.

6. A reel as set forth in claim 1 wherein said slot extends the entire width of said hub, and said hub being of sheet material with its ends spaced from each other to form said slot.

References Cited by the Examiner

UNITED STATES PATENTS

| | | | |
|---|---|---|---|
| 2,022,807 | 12/1935 | Hagerty | 242—74.2 |
| 2,425,827 | 8/1947 | Rancourt | 242—71.8 X |
| 2,616,634 | 11/1952 | Melkon | 242—74.2 |
| 2,691,491 | 10/1954 | Thalhammer | 242—74.2 |
| 2,931,591 | 4/1960 | Zorn | 242—74.2 |

FOREIGN PATENTS

| | | |
|---|---|---|
| 1,222,971 | 6/1960 | France. |
| 1,242,492 | 8/1960 | France. |

JORDAN FRANKLIN, *Primary Examiner.*

FRANK J. COHEN, *Examiner.*